Sept. 8, 1953  V. J. ZULLO  2,651,540
AUTOMOBILE FLOOR MAT FRAME
Filed Aug. 20, 1951
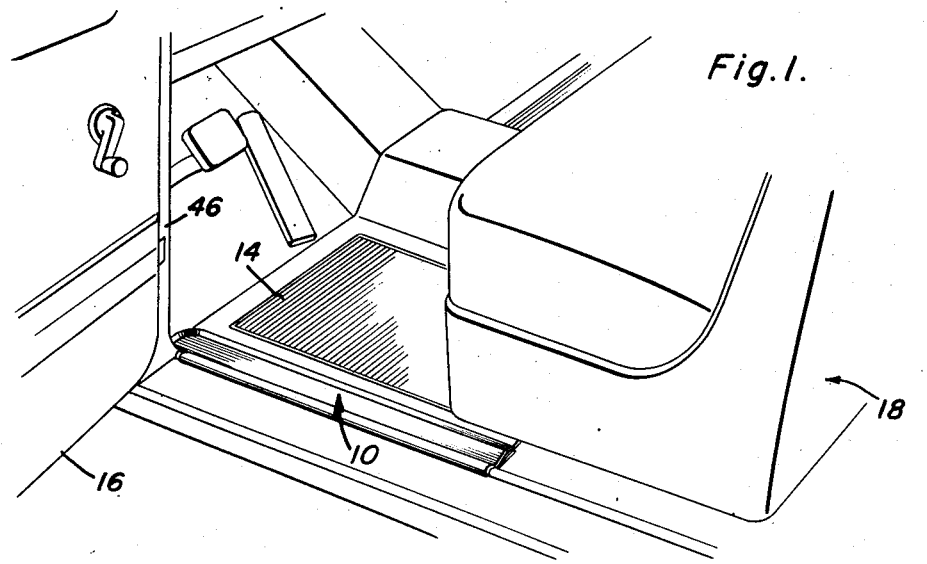
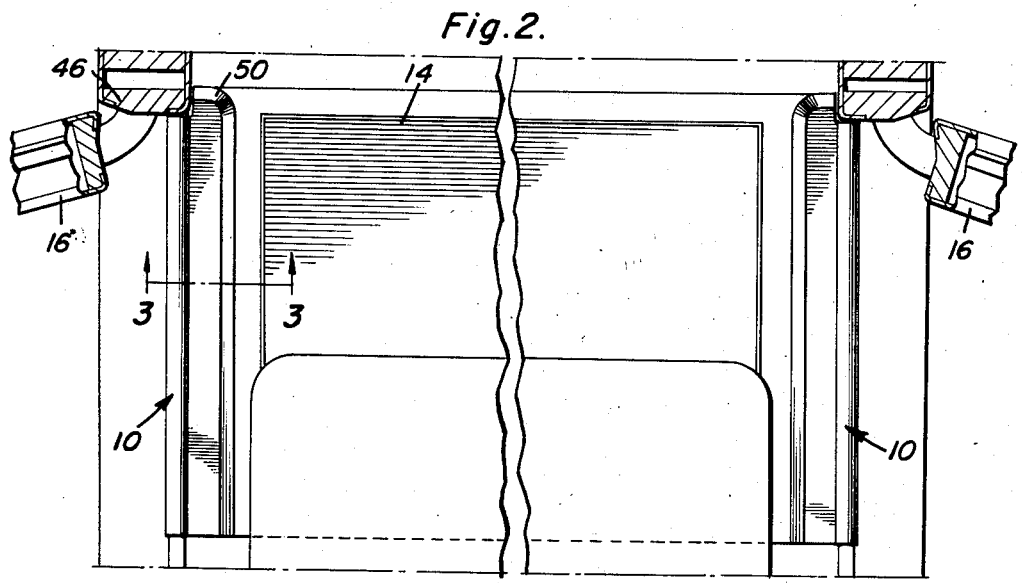
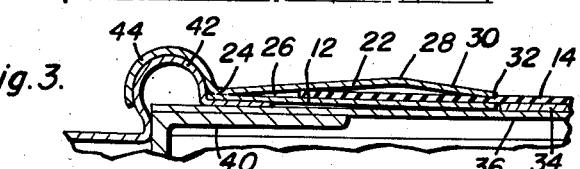
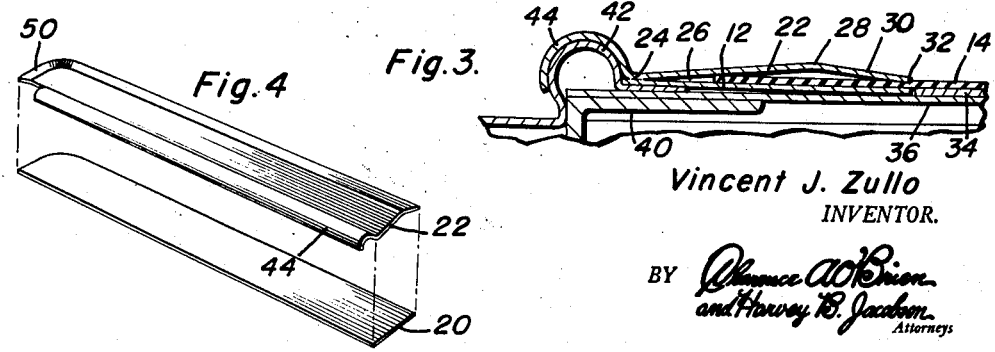
Vincent J. Zullo
INVENTOR.

Patented Sept. 8, 1953

2,651,540

UNITED STATES PATENT OFFICE 2,651,540

AUTOMOBILE FLOOR MAT FRAME

Vincent J. Zullo, Chicago, Ill.

Application August 20, 1951, Serial No. 242,675

4 Claims. (Cl. 296—1)

This invention relates to a floor mat frame and particularly to a frame for attaching the edge of an automobile floor mat to the door sill.

In the automotive industry it has long been customary to provide the floor of automobiles with suitable mats to provide a finish to the floor and also to improve the esthetic qualities of the automobile while at the same time adding to the comfort and convenience of the passengers. Such mats, particularly in the region of the door, are subject to extremely high usage, and frequently become unsightly because they are torn, scuffed up or discolored. Also in inclement weather such as in rainy weather or in snow and icy weather water, snow or ice is apt to be carried into the automobile and infiltered under the edge of the mat. Such accumulations are not only unsightly but frequently are discomfortable to the passengers in the car.

This invention provides a floor mat frame particularly for use on the edge of the mat adjacent the door opening for not only firmly connecting the mat to the door frame but for protecting the edge thereof so that it cannot be scuffed up, torn or otherwise become unsightly while at the same time preventing the access of moisture or snow to the underneath portion of the mat.

This desirable result is obtained according to this invention by providing a pair of plates welded together to provide a clamp applied to the edge of the mat adjacent to the door or opening and having an extension firmly clamped over the door sill.

It is accordingly an object of this invention to provide an improved mat fastener.

It is a further object of this invention to provide a floor mat frame for preventing damage to the floor mat.

It is a further object of this invention to provide a floor mat frame for protecting the edge of the floor mat.

It is a further object of this invention to provide a floor mat frame which can be rigidly connected to the door sill or floor molding of a car.

Other objects and many of the attendant advantages of this invention will be apparent from the following detailed description taken in conjunction with the accompanying drawings, in which:

Figure 1 is a perspective view of a portion of a side of a car showing the door open and the improved floor mat frame in place;

Figure 2 is a plan view of a portion of the floor of a car adjacent the doorway showing the floor mat frame in place;

Figure 3 is an enlarged cross-sectional view through the floor mat frame taken substantially on the line 3—3 of Figure 2; and Figure 4 is an exploded view showing the portions of the floor mat frame before they are secured together.

In the exemplary embodiment of the invention the floor mat frame 10 is applied to the edge 12 of a floor mat 14 adjacent the door 16 of an automotive vehicle 18. The floor mat frame 10 comprises a lower plate 20, an upper plate 22, the plates 20 and 22 being rigidly secured together, and preferably integrally united by some such means as a seam weld 24 to provide a diverging V-shaped mouth 26 into which the edge 12 of the mat 14 may be readily inserted.

The plate 22 is provided with a longitudinal break or crimp 28 so that the mouth portion is crimped transversely thereof whereby the rear portion 30 of the plate 22 slopes inwardly and downwardly to provide a jaw 32 for firmly engaging the mat 14 at the inward or rear edges of the plates 20 and 22. Usually, a padding or sub-base 34 is applied between the mat 14 and the floor 36 of the automobile 18. Preferably the padding 34 is eliminated at or immediately adjacent to the end of the bottom plate 20 so that the clamp member may be supplied to the edge of the mat and lay sufficiently flat so that there is no noticeable ridge or unsightly elevation of the clamp at the edge of the door sill. Usually the door sill 40 is finished by means of a beading or molding 42 which is usually substantially cylindrical in outward configuration and forms a continuation between the floor and the door sill. The door mat frame 10 is provided with a projection or extension 44 which is shaped to conform to the door stop or floor mold 42 and intended to snugly embrace the same.

Preferably the extension 44 is of sufficient length to fit from the door post 46 to the rear door post or any division line between the two door posts. However, in order to give a finished appearance and to further protect the edge of the mat the plates 20 and 22 extend past the door post and have an inwardly curved portion 50 so that the inward edge of the frame snugly turns into and smoothly approaches the inward side wall of the door post 46.

The frame 10 can obviously be constructed of various lengths to fit various types and models of automobiles, also the projection or extension 44 may be shaped to fit various types of floor moldings. The material of the plates 20 and 22 should have sufficient resilience that the mouth 26 can be opened up to receive the edge of the mat 14 after which the plates can be released and the jaw 32 will firmly grip the mat 14 between the inward rear edge of the plate 22 and the inward edge of the plate 20.

The application of the frame 10 as can readily be seen protects the edge of the mat so that it will not be scuffed up or torn while entering the automobile while at the same time the extension 44 being snugly received over the floor rail or molding 42 firmly holds the mat in place so that it cannot become wrinkled or otherwise become disfigured while preventing the access of moisture or snow onto the edge of the mat so that it may not become unsightly or soggy in wet weather.

While for purposes of illustration this specific embodiment of the invention has been shown and described according to the best present understanding thereof it will be apparent that many changes and modifications can be made therein without departing from the true spirit of the invention.

Having described the invention, what is claimed as new is:

1. In a vehicle body having a floor, a door opening having door frames intersecting the edge of the floor, a transversely curved floor molding on said floor between said door frames and a floor mat on the floor, a frame for attaching the floor mat to the floor molding comprising upper and lower plate members, said plates being spot welded together adjacent the outer edge to provide a V-shaped mouth adapted to receive the edge of a floor mat, said upper plate being bent transversely of the mouth to provide mat engaging jaws adjacent the inward edge of said frame, an extension on the outer edge of said upper plate, said extension being curved to clampingly engage the floor molding, said extension being of sufficient width to substantially fit between the door frames.

2. In a vehicle body having a floor, a door opening having door frames intersecting the edge of the floor, a transversely curved floor molding on said floor between said door frames and a floor mat on the floor, a frame for attaching the floor mat to the floor molding comprising upper and lower plate members, said plates being spot welded together to provide a V-shaped mouth adapted to receive the edge of a floor mat, said upper plate being bent transversely of the mouth to provide converging mat engaging jaws adjacent the inward edge of said frame, an extension on the outer edge of said upper plate, said extension being curved to clampingly engage the floor molding, said extension being of sufficient width to substantially fit between the door frames of said vehicle body, said plate members being of a length greater than the width of said door opening, the inner edges of said plate being curved to smoothly approach the edge of the mat inwardly from the door opening.

3. A floor mat frame for protecting the floor mat of a motor vehicle comprising a flat lower plate extending under the edge of said mat, an upper plate overlying the edge of said mat, said plates being rigidly united at the edge thereof immediately beyond the edge of said mat, the inward edge of said upper plate being inclined toward said lower plate providing jaws firmly engaging said mat, a molding engaging clamp on the joined edges of said frame, said clamp being of less length than said frame whereby said clamp is free to extend through a door while said frame extends behind the door frame.

4. In a vehicle body having a door opening, a floor intersecting said door opening, a transversely curved floor molding on the edge of the floor and extending across the door opening, and a floor mat on the floor, a floor mat frame for protecting the edge of the floor mat comprising a flat lower plate extending under the edge of said mat, an upper plate overlying the edge of said mat, said plates being rigidly united at the edge thereof immediately beyond the edge of said mat, the inward edge of said upper plate being inclined toward said lower plate providing jaws firmly engaging said mat inwardly from the edge, a molding engaging clamp on the joined edges of said frame, said clamp being of less length than said frame whereby said clamp is free to extend through the door while said frame extends behind the door frame, said clamp being contoured to snugly embrace the floor molding.

VINCENT J. ZULLO.

References Cited in the file of this patent

UNITED STATES PATENTS

| Number | Name | Date |
|---|---|---|
| 1,354,155 | Barclay | Sept. 28, 1920 |
| 1,423,143 | Patterson | July 18, 1922 |
| 1,914,399 | Bronson | June 20, 1933 |
| 2,004,204 | Jackson | June 11, 1935 |
| 2,449,904 | Lorraine | Sept. 21, 1948 |